Patented Aug. 7, 1951

2,563,459

UNITED STATES PATENT OFFICE 2,563,459

VINYL CHLORIDE-ALKOXYMETHOXYALKYL VINYL ETHER COPOLYMER

Ellsworth K. Ellingboe and Milton J. Roedel, Wilmington, Del., assignors to E. I. du Pont de Nemours & Company, Wilmington, Del., a corporation of Delaware No Drawing. Application May 20, 1948, Serial No. 28,275

2 Claims. (Cl. 260—87.5)

This invention relates to new compositions of matter and more particularly to polymeric materials and methods for their preparation.

This invention has as an object the preparation of new and useful polymeric materials. A further object is the manufacture of new resinous materials having valuable properties of particular utility in the coating arts. Still further objects reside in methods for obtaining these polymers.

The polymers of this invention are prepared by polymerizing a monomeric alkoxymethoxyalkyl vinyl ether corresponding to the general formula R—O—CH$_2$—O—R'—O—CH=CH$_2$, wherein R is an alkyl radical containing from 1 to 15 carbon atoms and R' is a bivalent acyclic hydrocarbon radical containing from 2 to 7 carbon atoms. This invention also includes the insolubilized products obtained by the heat-treatment of these polymers in the manner described hereinafter.

The monomeric alkoxymethoxyalkyl vinyl ethers that are polymerized in accordance with this invention are obtained by reacting an alkoxymethoxyalkanol of the formula ROCH$_2$OR'OH, wherein R and R' are as defined above, with acetylene in an alkaline medium under a pressure in excess of 100 lb./sq. in. and a temperature of from 100° to 250° C.

In a suitable method for preparing these vinyl ethers a pressure reactor is charged with alkoxymethoxyalkanol and with from 1.5 to 3% by weight of an alkali metal hydroxide, the reactor is flushed with oxygen-free nitrogen and then evacuated. The reactor is then pressured with acetylene to about 100 lb./sq. in., evacuated, and repressured with acetylene. The charged reactor is placed on a rocker mechanism equipped for heating and agitating the contents of the reactor. After the reaction mixture has reached the selected reaction temperature, the pressure within the reactor is adjusted to between 100 and 300 lb./sq. in. by injection of acetylene. The pressure within the reactor is maintained within the selected range for from 10 to 25 hours. After this period of reaction, the reactor is permitted to cool, the excess acetylene is bled from the reactor, and the contents discharged. The reaction product is diluted with from one-third to one-half its volume with diethyl ether, the solution is extracted with water to remove unreacted alkoxymethoxyalkanol and alkali metal hydroxide, and the ether solution dried with anhydrous potassium carbonate. The dried extract is then subjected to distillation to remove the diethyl ether and recover the alkoxymethoxyalkyl vinyl ether. To the alkoxymethoxyalkyl vinyl ether thus obtained a polymerization inhibitor, such as phenylenediamine, may be added to prevent premature polymerization. Examples of alkoxymethoxyalkyl vinyl ethers which can be prepared as described above are methoxymethoxyethyl vinyl ether, butoxymethoxyethyl vinyl ether, ethoxymethoxyethyl vinyl ether, butoxymethoxypentyl vinyl ether, octyloxymethoxypropyl vinyl ether, hexoxymethoxyethyl vinyl ether, octyloxymethoxyethyl vinyl ether, pentadecyloxymethoxyethyl vinyl ether, and the like.

The alkoxymethoxyalkyl vinyl ethers are polymerized alone or in admixture with from 5 to 95% by weight of one or more of another polymerizable monomer with the aid of a polymerization catalyst. In the case of the homopolymers the catalysts are of the ionic-type catalysts such as boron trifluoride, ferric chloride, aluminum chloride and the like. The copolymers are also readily obtained with free-radical producing materials as the catalysts, e. g., azo compounds, azines, oximes, amine oxides, peroxides, persalts, hydroperoxides, percarboxylic acid esters, and the like. The amount of catalyst is generally in the range of from 0.001 to 5% by weight of the alkoxymethoxyalkyl vinyl ether alone or alkoxymethoxyalkyl vinyl ether and other polymerizable monomers present. The polymerization can be effected at atmospheric or superatmospheric pressure and, depending upon the particular monomeric composition to be polymerized and the catalyst used, at temperatures of from —80° C. to 150° C.

In a typical polymerization to produce alkoxymethoxyalkyl vinyl ether polymers, a suitable reactor is charged with the monomeric alkoxymethoxyalkyl vinyl ether alone or in conjunction with one or more of another polymerizable monomer, such as vinyl and vinylidene compounds, which are referred to generically as vinylidene compounds, a vinylene compound, a diene, carbon monoxide, etc., together with a suitable polymerization catalyst, and if desired, a solvent or diluent. The mixture is then subjected to polymerization conditions until the desired degree of polymerization has been attained. In the case of the copolymers obtained from the present alkoxymethoxyalkyl vinyl ether with one or a plurality of other polymerizable comonomers, each of the latter components should be present in amounts of at least 5% by weight of the total monomers polymerized. The most valuable products are those in which the alkoxymethoxyalkyl vinyl ether component is present to the extent of at least 15% by weight of the total monomers polymerized. Examples of suitable copolymerizable monomers of the kind mentioned above are vinyl chloride, vinylidene chloride, vinyl acetate, vinyl fluoride, vinylidene fluoride, difluorovinylidene chloride, tetrafluoroethylene, difluorovinylidene chloride, trichlorofluoroethylene, vinyl trimethyl acetate, vinyl benzoate, acrylonitrile, methacrylonitrile, styrene, alpha-methylstyrene, ethylene, isobutylene, vinyl methyl ether, vinyl isobutyl ether, vinyl methyl ketone, methyl acrylate, methyl methacrylate, maleic anhydride, dimethyl maleate, diethyl fumarate, allyl acetate, diallyl phthalate, N-vinyl succinimide, 2,3-dichloro-1,3-butadiene, 2-chloro-1,3-butadiene, butadiene, isoprene, carbon monoxide, Chinawood oil, linseed oil, dehydrated castor oil, etc. Two or more monomeric alkoxymethoxyalkyl vinyl ethers may be polymerized, if desired. The copolymers with vinyl acetate and other vinyl carboxylates may be partially or completely hydrolyzed and the resulting products, after conversion to fibers, films, etc., cross-linked.

The polymeric alkoxymethoxyalkyl vinyl ethers produced in accordance with this invention by polymerization of an alkoxymethoxyalkyl vinyl ether alone or admixed with one or more of another polymerizable organic compound may be crosslinked by heat-treatment at a temperature above 65° C. in the presence of an acidic material or a material which is capable of yielding an acid. Examples of such materials are organic and inorganic acids such as para-toluenesulfonic acid, alpha-camphorsulfonic acid, butanesulfonic acid, benzenesulfonic acid, etc., hydrochloric acid, etc., acid-yielding salts such as zinc chloride, aluminum chloride, stannic chloride, ferric chloride, etc. From 0.001 to 5% of the acid or acid-yielding material, based on the weight of the polymeric alkoxymethoxyalkyl vinyl ether in the composition, is usually sufficient to effect cross-linking. The cross-linking may be effected by dissolving the polymeric alkoxymethoxyalkyl vinyl ether in a suitable solvent, adding the conversion catalyst, depositing the solution in the form of a film, fiber, etc., and then heating above the indicated temperature. As a rule, cross-linking occurs in 10 to 30 minutes at a temperature within the range of 65° to 200° C. If desired, and/or needed, longer curing times and higher conversion temperatures may be employed.

The examples which follow are submitted to illustrate and not to limit this invention. Unless otherwise stated parts are by weight.

*Example I*

A pressure reactor was charged with methoxymethoxyethanol and powdered potassium hydroxide in the proportions 100:2.5, respectively, the total charge occupying not more than 60% of the volume capacity of the reactor at room temperature. The vessel was then flushed with oxygen-free nitrogen, closed, and pressured to 500 lb./sq. in. with nitrogen. The reactor was evacuated, pressured with acetylene to about 100 lb./sq. in., re-evacuated, and again pressured with acetylene to 100 lb./sq. in. The charged reactor was rocked and heated to an internal temperature of 175° C. at which point additional acetylene was injected to a top pressure of 220 lb./sq. in. The rocking was continued and the temperature held at 175° C. for 12 hours. During this period the pressure was maintained in the range 200–220 lb./sq. in. by injection of additional acetylene whenever the pressure dropped to 200 lb./sq. in. At the end of the 12-hour period the reactor was allowed to cool to room temperature, the excess acetylene was bled off, the vessel was opened and the contents were discharged. The reaction product, diluted with about half its volume of diethyl ether, was extracted successively with 5 portions of water each of about one-tenth the initial volume of the product. The washed solution was dried over anhydrous potassium carbonate and then fractionated through an efficient distillation column. The methoxymethoxyethyl vinyl ether thus obtained boiled at 44° C./10 mm.; $n_D^{25}=1.4151$, $d_4^{25}=0.961$. The yield was 80–90% of the theoretical amount, based on methoxymethoxyethanol.

Copolymers with vinyl chloride were prepared as follows:

A pressure reactor was charged at room temperature with 1.6 parts of alpha,alpha'-azobis-(alpha,gamma-dimethylvaleronitrile), 0.8 part of borax, 35 parts of benzene, 40 parts of water, and 80 parts of methoxymethoxyethyl vinyl ether monomer ($CH_3OCH_2OCH_2CH_2OCH=CH_2$). The reactor was flushed with oxygen-free nitrogen, evacuated, cooled, and 120 parts of vinyl chloride was then added. The reaction mixture was heated to 45° C. for 12 hours under autogenous pressure, with agitation. The reactor was then cooled to room temperature, bled down to atmospheric pressure, opened, and the reaction product removed. As much water as possible was separated from the two-phase mixture, and the remainder was diluted with about 50 parts of acetone and then added to a large excess of methanol with rapid stirring. The coagulated polymer was filtered, air-dried, dissolved in acetone, and recoagulated in an excess of methanol. The coagulation procedure was repeated a third time after which the polymer was dried under vacuum at room temperature. The yield of dry polymer was 96 parts, and analysis for chlorine indicated a methoxymethoxyethyl vinyl ether content of 20% by weight. The polymer was soluble in xylene, with a viscosity at 25° C. of 2.0 poises for a 20% by weight solution.

A mixture consisting of 1.6 parts of alpha,alpha'-azodiisobutyronitrile, 0.8 part of borax, 35 parts of benzene, 40 parts of water, 100 parts of methoxymethoxyethyl vinyl ether and 100 parts of vinyl chloride was placed in a stainless steel pressure reactor and heated for 12 hours at 60° C. under autogenous pressure. The yield of coagulated and dried copolymer was 95 parts, and the vinyl ether content was 32%, according to analysis for chlorine. The viscosities at 25° C. of solutions in xylene were 0.14, 1.00, and 5.00 poises at 20, 30, and 40% concentrations, respectively.

Clear and pigmented coatings of these polymers, applied over Bonderized steel and baked 30 minutes at 149° C., possessed excellent inertness, solvent resistance, adhesion, impact flexibility, and soap-bath resistance. The use of zinc oxide or zinc chloride catalysts lowered the curing temperature to 121° C. for 30 minute baking schedules.

*Example II*

To prepare butoxymethoxyethyl vinyl ether, the procedure of Example I is followed using butoxymethoxyethanol in place of methoxymethoxyethanol. Fractionation of the dried ether solution of washed product gives butoxymethoxyethyl vinyl ether in 80–90% of the theoretical yield based on butoxymethoxyethanol; B. P. 74° C./6 mm., $n_D^{25}=1.4224$, $d_4^{25}=0.9215$.

Polymers with vinyl chloride are prepared as follows:

Using the procedure described in Example I, butoxymethoxyethyl vinyl ether was polymerized with vinyl chloride in mixtures containing 1.6 parts of alpha,alpha'-azodiisobutyronitrile, 0.8 part of borax, 35 parts of benzene and 40 parts of water for every 200 parts of total monomers. The monomers were employed at vinyl ether/vinyl chloride ratios of 60/140, 80/120 and 100/100 to yield 111, 136 and 112 parts of polymers containing 16.8, 26.2, and 30.7% of combined vinyl ether, respectively. The polymer containing 16.8% butoxymethoxyethyl vinyl ether was not completely soluble in xylene, but those containing 26.2 and 30.7 vinyl ether were soluble, giving 20% solutions having 0.32 and 0.22 poise viscosities, respectively. These copolymers were capable of insolubilization by crosslinking under the influence of heat, with or without addition of acidic accelerators. Their curing properties were similar to those previously described in Example I for copolymers of vinyl chloride with methoxymethoxyethyl vinyl ether.

The polymeric alkoxymethoxyalkyl vinyl ethers are suitable for a host of outlets such as decorative, industrial, and maintenance finishes, coated fabrics, synthetic fibers, and monofils, unsupported sheeting, wrapping films, safety glass interlayers, coated fabric outlets, adhesives, cable and wire coatings, laminates, artificial tile and floor coverings, tubing, molded plastic articles and like outlets. Plasticizers, pigments, dyes, reinforcing agents and like materials commonly used in formulating polymeric compositions can be used, if desired, and/or needed, in conjunction with the polymeric alkoxymethoxyalkyl vinyl ethers.

*Example III*

Using the procedure described in Example I, a mixture of 40 parts of methoxymethoxyethyl vinyl ether, 40 parts of freshly distilled vinyl acetate and 120 parts of vinyl chloride was copolymerized at 65° C. for 12 hours in a medium comprising 35 parts of benzene, 40 parts of water, 0.8 part of borax and 1.6 pars of alpha,alpha'-azodiisobutyronitrile. The product obtained in a yield of 140 parts was a white solid which contained 74.8% vinyl chloride, according to analysis for chlorine content. This polymer was soluble in xylene, a 20% solution having a viscosity of 0.22 poise at 25° C. Clear coatings at 1 mil thickness were almost completely insolubilized when baked 30 minutes at 149° C. and were completely insolubilized at a baking temperature of 163° C.

The following examples show the results obtained in the case of three component copolymers obtained by procedures similar to those outlined above. The viscosity figures mentioned were determined on 20% xylene solutions at 25° C.

*Example IV*

Thirty parts of methoxymethoxyethyl vinyl ether were copolymerized with 30 parts of ethylene and 90 parts of vinyl chloride. The yield of copolymer having a viscosity of 0.14 poise was 62.5 parts of which 75.3% is vinyl chloride. Clear coatings of one mil thickness upon baking at 149° C. were found to be insoluble in solvents for the original polymer.

*Example V*

Thirty parts of methoxymethoxyethyl vinyl ether were copolymerized with 30 parts of isobutylene and 140 parts of vinyl chloride. The yield of copolymer having a viscosity of 0.03 poise was 97 parts of which 79.4% is vinyl chloride. Clear films of one mil thickness upon baking at 149° C. were found to be insoluble in solvents for the original polymer.

*Example VI*

Forty parts of methoxymethoxyethyl vinyl ether were copolymerized with 40 parts of difluorovinylidene chloride and 120 parts of vinyl chloride. The yield of copolymer having a viscosity of 0.22 poise was 150 parts of which 57% is vinyl chloride. Clear films of one mil thickness upon baking at 149° C. were found to be insoluble in solvents for the original polymer.

*Example VII*

Eighty parts of methoxymethoxyethyl vinyl ether were copolymerized with twenty parts of isobutyl methacrylate and 100 parts of vinyl chloride. The yield of copolymer having a viscosity of 0.06 poise was 113 parts of which 38.5% is vinyl chloride. Clear films of one mil thickness upon baking at 149° C. were found to be insoluble in solvents for the original polymer.

*Example VIII*

Forty parts of methoxymethoxyethyl vinyl ether were copolymerized with 40 parts of vinyl trimethylacetate and 120 parts of vinyl chloride. The yield of copolymer having a viscosity of 0.22 poise was 132.5 parts of which 68.5% is vinyl chloride. Clear films of one mil thickness upon baking at 149° C. were found to be insoluble in solvents for the original polymer.

*Example IX*

Sixty parts of methoxymethoxyethyl vinyl ether were copolymerized with 40 parts of vinyl benzoate and 100 parts of vinyl chloride. The yield of copolymer having a viscosity of 0.14 poise was 106 parts of which 61.1% is vinyl chloride. Clear films of one mil thickness upon baking at 149° C. were found to be insoluble in solvents for the original polymer.

*Example X*

Twenty parts of methoxymethoxyethyl vinyl ether in 20 parts of diethyl ether was cooled to −80° C. and to this solution there was added dropwise 0.4 part of $BF_3.(C_2H_5)_2O$ in 10 parts of diethyl ether. The polymer obtained upon removal of the diethyl ether was found to be soluble in benzene.

The invention described herein provides an economical source of polymeric or resinous materials which, by reason of their high inertness, solvent resistance, adhesion, flexibility, and resistance to chemicals, are of particular value in the coating and film-forming fields.

As many apparently widely different embodiments of this invention may be made without departing from the spirit and scope thereof, it is to be understood that we do not limit ourselves to the specific embodiments thereof except as defined in the appended claims.

We claim:

1. Polymeric material comprising the copolymerization product of vinyl chloride and methoxymethoxyethyl vinyl ether.

2. Polymeric material comprising the copolymerization product of vinyl chloride and an alkoxymethoxyalkyl vinyl ether of the formula R—O—CH$_2$—O—R'—OCH=CH$_2$, wherein R is an alkyl radical containing from 1 to 15 carbon atoms, inclusive, and R' is a bivalent acyclic hydrocarbon radical containing from 2 to 7 carbon atoms, inclusive.

ELLSWORTH K. ELLINGBOE.
MILTON J. ROEDEL.

REFERENCES CITED

The following references are of record in the file of this patent:

UNITED STATES PATENTS

| Number | Name | Date |
|---|---|---|
| 2,016,490 | Fikentscher | Oct. 8, 1935 |
| 2,104,002 | Reppe et al. | Dec. 28, 1937 |
| 2,477,218 | Thompson | July 26, 1949 |